Dec. 13, 1960  R. A. QUINTARD  2,964,014
HYDRAULIC POWER UNIT AND CONTROL
Filed Aug. 26, 1957  4 Sheets-Sheet 1

Inventor
RAYMOND A. QUINTARD
By
William M. Alexander
Attorney

Inventor
RAYMOND A. QUINTARD
By
William M. Alexander
Attorney

Dec. 13, 1960 R. A. QUINTARD 2,964,014
HYDRAULIC POWER UNIT AND CONTROL
Filed Aug. 26, 1957 4 Sheets-Sheet 4

Inventor
RAYMOND A. QUINTARD
By
William M. Alexander
Attorney

United States Patent Office 2,964,014
Patented Dec. 13, 1960

2,964,014

HYDRAULIC POWER UNIT AND CONTROL

Raymond A. Quintard, Ezanville, France, assignor to Cie Massey - Harris - Ferguson, Marquette-lez-Lille (Nord), France Filed Aug. 26, 1957, Ser. No. 680,192

7 Claims. (Cl. 121—39)

This invention relates to a variable speed drive incorporating a hydraulic motor.

An object of the present invention is to provide such a variable speed drive which lends itself readily to automatic speed control.

A further object of the invention is to provide such a variable speed drive with which a continuously variable, or so-called "infinitely variable," speed gear can readily be used.

The invention is a variable speed drive comprising a hydraulic motor driven from a source of liquid under pressure, a rotary control element driven as a means of control, and valve means interposed between said control element and the motor for automatically causing the motor to revolve in synchronism with said control element, said valve means comprising relatively rotatable valve members respectively having connections, so as to rotate, with said control element and the motor.

Preferably, the valve members respectively have cooperating motor-supply ports and co-operating by-pass ports so relatively arranged in each valve member that a relative rotation between the valve members which causes opening movement of the motor-supply ports will simultaneously cause closing movement of the by-pass ports, and vice versa.

The control element may be driven from what may be called an "investigator" element. For instance, this investigator element may be a ground-engaging wheel in an agricultural implement from which the hydraulic motor causes a substance, such as seed or fertilizer, to be delivered in proportion to the distance traversed by the implement.

Preferably, a variable ratio gear is interposed between the control element and the valve member connected with it; and, seeing that the control element may not require substantial torque, the arrangement lends itself to the use of an infinitely variable speed gear. This gear may be of the friction type including offset discs frictionally interconnected by a ball, roller or the like rolling drive-transmitter which can be adjusted relatively to the disc axes to give a wide range of continuously variable speed ratios.

The rotatable valve members may constitute a cylinder and piston device subjected to axial pressure from the pressure liquid, this pressure being applied to one of the discs to maintain the frictional drive between said discs.

The hydraulic motor may be of the sliding vane type.

An overload-release safety valve may be provided for the escape of hydraulic liquid in the event of undue load on the hydraulic motor.

The invention will now be described, by way of example, with reference to the accompanying drawings, in which:

In Fig. 5, the rotary component of the motor and associated parts are removed.

Figure 1:
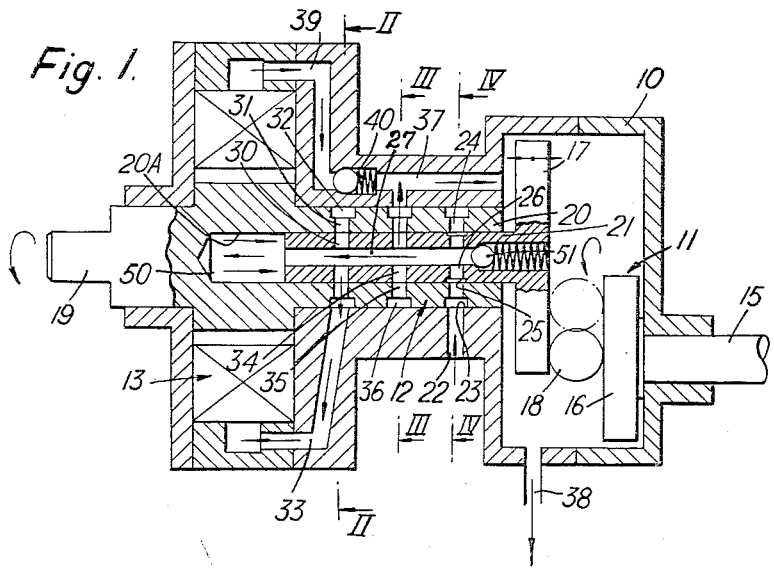
Fig. 1 is a diagrammatic section of a hydraulic variable speed drive according to the invention.
Figure 8:
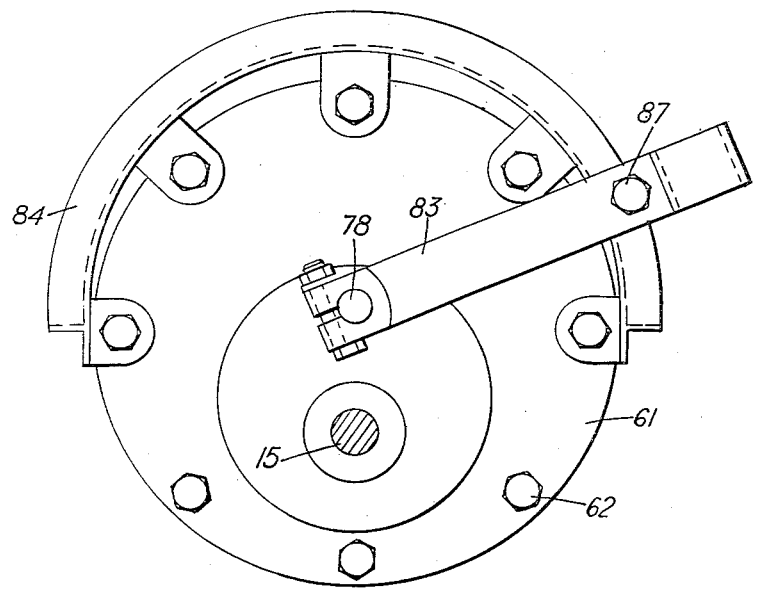
Figs. 5, 6, 7, 8 and 9 are detail views of an example of a practical form of the invention, Fig. 5 being a sectional plan, Fig. 6 a section on the line VI—VI of Fig. 5, Fig. 7 a section on the line VII—VII of Fig. 6, Fig. 8 a view in the direction VIII—VIII of Fig. 5, and Fig. 9 a section on the line IX—IX of Fig. 6.

Referring more particularly to Fig. 1 of the drawings, there is shown a variable speed drive comprising a casing 10 housing an infinitely variable speed gear 11, valve means 12 and a hydraulic motor 13 driving an output shaft 19.

The infinitely variable speed gear includes an input shaft 15, which may be termed the "investigator" shaft and which is the control element of the drive. In the example, the shaft 15 is driven from a ground wheel (not shown) of an agricultural implement, a seed drill for example. The shaft carries, at its end projecting into the casing 10 a friction drive disc 16. A driven disc 17 is located with its axis spaced from the axis of the drive disc 16, and a drive-transmitting ball 18 is provided between the two discs 16, 17. The ball 18 is adjustable radially in relation to the axes of both discs 16, 17; it can be located in any position between the extreme positions, indicated by full and dotted line positions shown in Fig. 1, to give speed ratios varying from a maximum reduction of, for example, 60–1 in the full line position to a 1–1 drive in the dotted line position.

Figure 4:
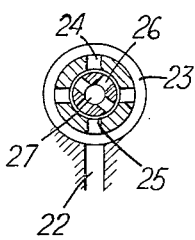
Fig. 4 is a section of the valve means on the line IV—IV of Fig. 1.

The valve means 12 consists of an outer member 20, which is a cylindrical sleeve rotatable with the hydraulic motor 13 and is enclosed in an intermediate portion of the casing 10, and an inner member 21 which is a cylindrical body fitting in a bore 20A in the outer member 20 and is rotatable with the driven disc 17. The casing 10 is provided with an inlet port 22 which communicates with an annular chamber 23 in the outer member 20, a series of radial ports 24, four in this example as Fig. 4 shows, all leading from the annular chamber 23 through the valve member 20 to a corresponding annular chamber 25 in the inner valve member 21 from which extend a similar series of ports 26 to a central bore 27 in the inner member 21.

Figure 3:
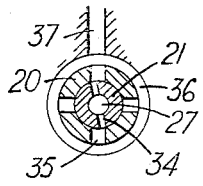

The outer valve member 20 is provided with two further annular chambers 32, 36, the chambers 23, 36 and 32 being spaced along the length of the outer valve member 20. The annular chamber 32 communicates with the hydraulic motor 13 through a duct 33, as Fig. 1 shows, and with the central bore 27 through radial motor supply ports 30 and 31 in the inner and outer valve members respectively. The annular chamber 36 communicates with the central bore 27 through radial by-pass ports, called "spill" ports, 34, 35 in the inner and outer valve members respectively, as Fig. 3 shows, and also with the infinitely variable speed gear 11 through a duct 37 in the casing 10.

Depending on the relative positions of the two valve members 20, 21, oil may flow from the bore 27 through the supply ports 30 in the inner valve member 21, the supply ports 31 in the outer valve member 20 and the annular chamber 32 to the duct 33 in the casing 10 to drive the vane assembly of the hydraulic motor 13 and thus the output shaft 19. Alternatively, the relative positions may be such that the oil flow is through the spill ports 34, 35 of the inner and outer valve members respectively to the annular chamber 36, and thence through the duct 37 to the oil reservoir by way of a return port 38 in the casing 10. The oil in its passage flows through the portion of the casing 10 containing the infinitely variable speed gear 11, the oil thus serving to lubricate the gear 11 before returning to the reservoir.

Return of oil from the hydraulic motor 13 to the oil reservoir is through a duct 39 in the casing 10. This duct leads from the motor to the duct 37, by way of a spring-urged non-return valve 40 serving to prevent any risk of flow of back-pressure oil from the duct 37, to the hydraulic motor 13.

In order to understand the operation of the drive, let it be assumed that the input shaft 15 is stationary. Under this condition the inner valve member 21, the hydraulic motor 13 and the outer valve member 20 also are stationary. Let it be assumed also that the valve ports are in the relative positions shown in Figs. 2, 3 and 4. Thus, the oil flow from the bore 27 is through the spill ports 34, 35 and duct 37 (Fig. 3) to the oil reservoir and there is no oil flow to the hydraulic motor 13, the supply ports 30 and 31 (Fig. 2) being closed to each other. Whenever the inner valve member 21 is stationary, the various ports will have the relative positions according to Figs. 2, 3 and 4, because if the motor is turning and the outer valve member 20 attains the position shown in Fig. 2 there is no oil flow to the motor 13 and thus the motor 13 will stop.

Figure 2:
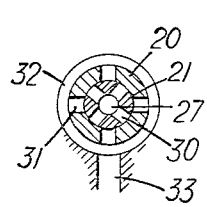
Figs. 2, 2a, 2b, 2c and 3, 3a, 3b, 3c are sections of the valve means of the drive on the lines II—II and III—III respectively under different conditions.
Figure 2A:
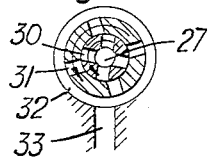
Figure 3A:
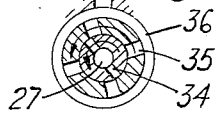

If the shaft 15 begins to rotate in such direction that the inner valve member 21 rotates anti-clockwise, as viewed in Figs. 2 to 3, the motor supply ports 30, 31 are partly opened to each other, and the spill ports 34, 35 are partly closed. Thus oil is supplied to the motor 13, which commences to rotate, and the outer valve member 20 rotates with the motor in the same direction as the inner valve member 21. In this manner an automatic balance is set up in which the two sets of ports 30, 31 and 34, 35 are each partly open (Figs. 2a and 3a) and the two valve members 20, 21 are rotating at the same speed.

Figure 2B:
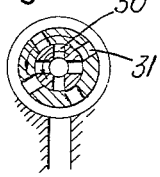
Figure 3B:
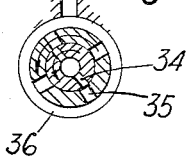

If the speed of the outer valve member 20 rises relatively to that of the inner valve member 21 the port positions shown in Figs. 2b and 3b are progressively approached; that is to say, the motor supply ports 30, 31 become more or less closed and the spill potrs 34, 35 become more or less full opened. Thus the supply of oil to the motor is reduced to slow it down until the condition of equilibrium, and consequently of synchronism, is again attained.

Figure 2C:
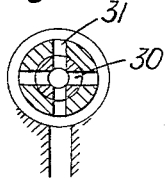
Figure 3C:
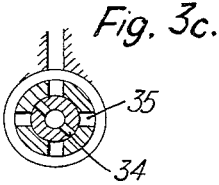
Figure 5:
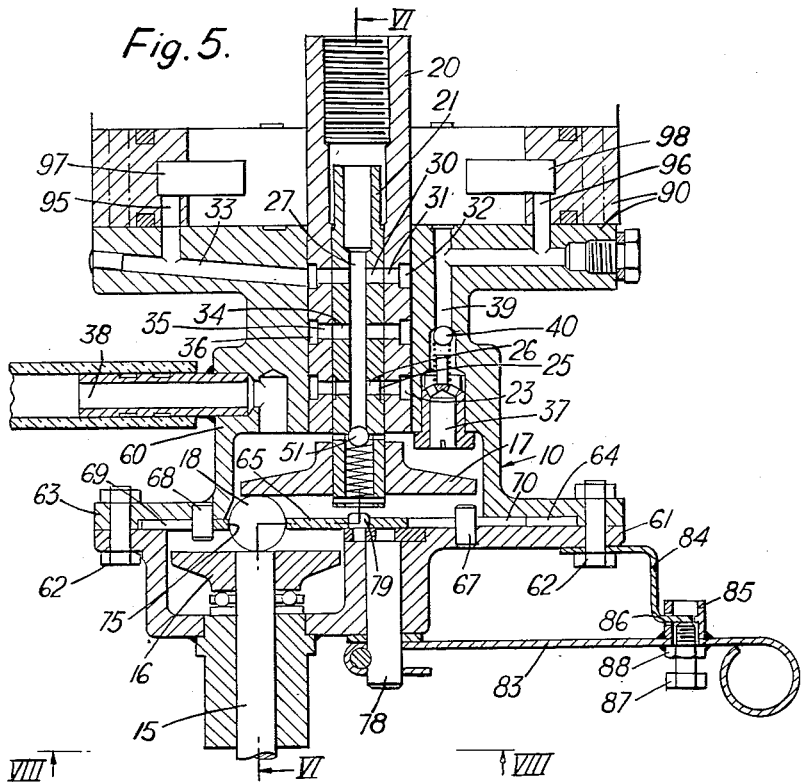

If the speed of the outer valve member 20 falls relatively to the speed of the inner valve member 21, the motor supply ports 30, 31 approach the full open position and the spill ports 34, 35 approach the fully closed position shown in Figs. 2c and 3c. Thus, the flow of oil is more or less completely directed to the motor 13 to speed it up and bring the outer valve member 20 once again into synchronism with the inner valve member 21.

The relative amounts of oil flowing through the spill ports 34, 35 and the motor supply ports 30, 31, respectively, when the valve members 20, 21 are rotating in synchronism will depend on the speed of the motor 13. Higher speeds require a greater flow of oil to the motor 13. The pressure of the oil flowing to the motor 13 will depend on the load to which the motor is subjected. Thus, alteration in the relative speed of the valve members 20, 21 may be due either to variation of the load on the motor 13 or to variation in the investigator speed, namely the speed of the shaft 15; and it will be obvious that whatever the variation in load on the motor 13, subject to a maximum load, the motor speed will be synchronised with the investigator speed by automatic variation in the relative openings of the supply and spill ports 30, 31 and 34, 35, respectively.

To prevent overloading of the hydraulic system a spring-urged safety valve 51 is fitted in the central bore 27 to open and release oil at a predetermined pressure.

It will be noted on reference to Fig. 3 that the spill ports 34 are small in relation to the other ports; this ensures that the oil in the bore 27 is always under pressure. Such pressure is desirable in that firstly it ensures immediate operation of the motor 13 after the motor has been at rest and secondly it can be utilized to maintain the discs 16, 17 in close engagement with ball 18. This second effect is obtained by making the inner valve member 21 shorter than the bore 20A containing it, thus providing a chamber 50 in which the oil under pressure acts on the end of the inner valve member 21 to urge the disc 17 towards the disc 16. The parts 20, 21 thus act in the manner of an hydraulic cylinder and piston device.

Referring now to Figs. 5 to 9 of the drawing, the hydraulic system is essentially the same as described with reference to Figs. 1 to 4, and therefore only additional details of the practical form will be described. Parts already described with reference to Figs. 1 to 4 are given the same reference numbers in Figs. 5 to 9.

The general casing 10 includes a main casing 60 which houses the valve means 12 and is open at one end to receive the driven disc 17. A cover plate 61, which is shaped to house the driving disc 16, is secured to the main casing by bolts 62. A circular flange 63 integral with the main casing 60 has a circular recess 64 in which a disc 65 is a sliding fit. Pins 67 and 68 extend from the cover plate 61 and the main casing 60 respectively into radial slots 69 and 70 (Fig. 7) in the disc 65 to locate this disc angularly in relation to the casing.

The drive-transmitting ball 18 is received in a hole 75 in the disc 65, and means is provided to move the disc 65 so that the ball 18 may be located in a selected position to give the desired speed reduction to the driven disc 17.

In the example, the means for moving the disc 65 consists of a rotatable shaft 78 extending through the cover plate 61 and carrying at its inner end an eccentric pin 79 (Figs. 5 and 7) in engagement with a slot 80 in the disc 65. A handle 83 is rigidly attached to the outer end of the shaft 78 and is movable over, and capable of being locked at a desired position on, a quadrant 84. The locking means is a hollow cylindrical member 85 welded to the handle 83 and having a slot 86 into which the quadrant 84 projects. A set screw 87 is screwed through a nut 88 welded to the handle 83 and engages the quadrant so as to lock the handle 83 in position. Thus, to change the speed ratio between the discs 16, 17, the set screw 87 is loosened and the handle 83 moved to the desired position. The quadrant 84 may have a scale engraved on it to indicate, for instance in the case of a seed drill, the quantity of seed sown per acre.

Figure 9:
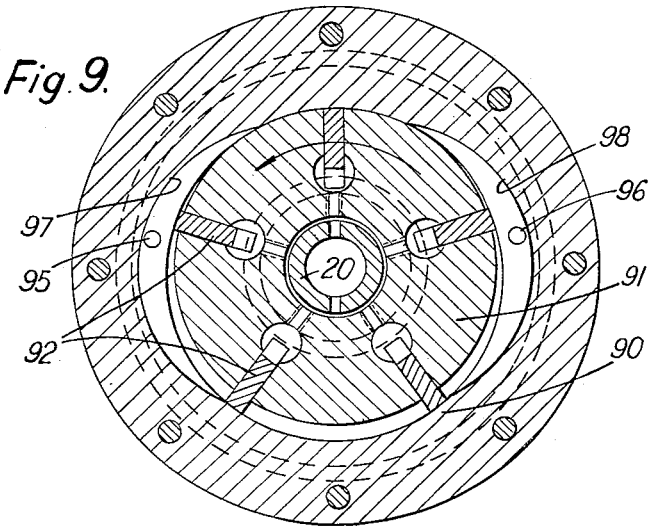
Figure 6:
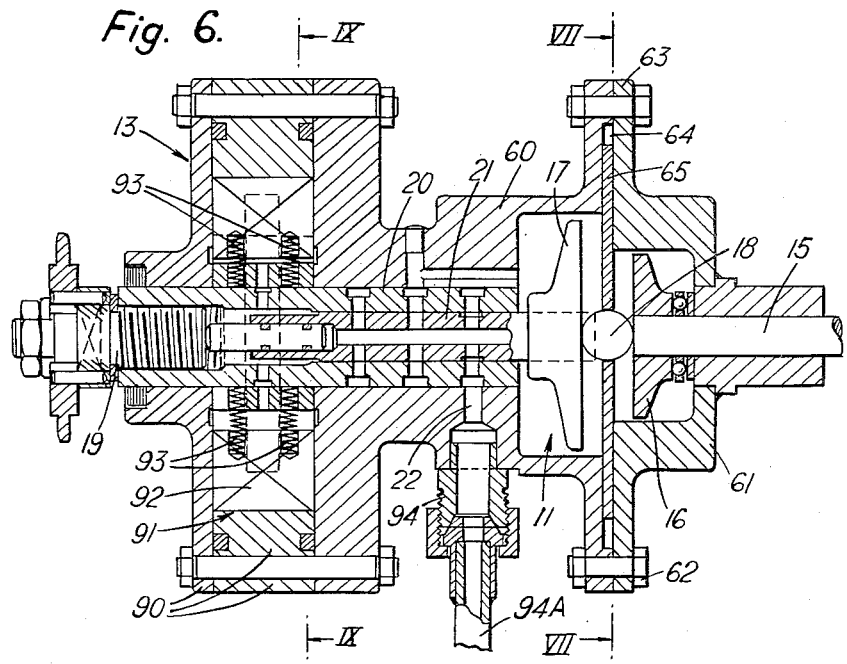
Figure 7:
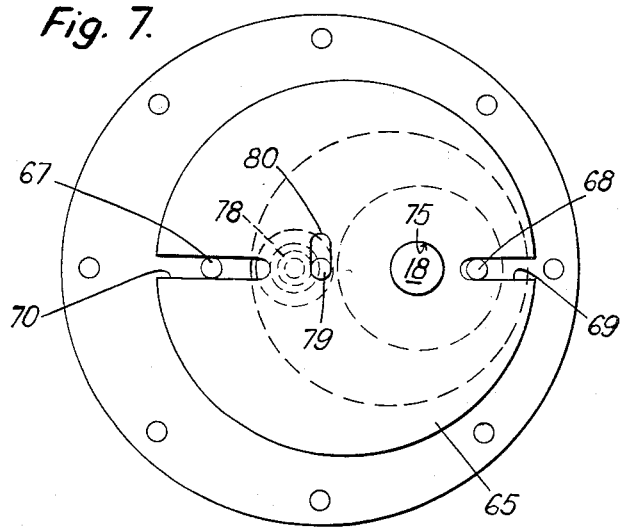

The hydraulic motor 13 may be of any appropriate form. In the example the motor is of the sliding vane type. The motor consists of an outer casing 90 and a rotor 91 eccentrically mounted within the casing as shown in Fig. 9. Vanes 92 mounted to extend radially from the rotor 91 are yieldably urged by means of springs 93 (Fig. 6) into contact with the cylindrical interior of the casing 90. Oil under pressure is supplied to the inlet port 22 through a branch 94 to which is connected a flexible conduit 94A leading from a source of supply. Oil passed by the valve means 12 is admitted to the motor through a port 95 and serves to rotate the rotor. An exhaust port is indicated by 96. The ports 95 and 96 lead between the interior of the motor casing 90 and the ducts 33 and 39, respectively. The ports 95 and 96 open into crescent-shaped recesses 97 and 98, respectively, formed in the cylindrical interior of the motor casing 90. The arrangement is such that the rotor when in operation rotates anti-clockwise.

Although the invention has been described throughout as having the outer valve member of the valve means driven by the hydraulic motor and the inner valve member by the investigator input shaft, it will be obvious that this arrangement could be reversed.

A variable speed drive according to the invention is especially although not exclusively suitable for use with an agricultural implement hitched to or trailed by a tractor having a hydraulic system, the hydraulic motor of the drive being driven by oil supplied to it under pressure through a connection (such as the flexible conduit 94A) with the tractor hydraulic system, so that this system bears the load of operating whatever component of the implement is driven by the motor, whereas the comparatively light work of operating the valve means by which the the motor is controlled is performed by the ground-engaging wheel or other investigator element provided on the implement to operate at a variable speed proportional to the speed of the implement. The construction is such that the motor rotates at the speed determined by the control element despite variations in the speed of this element and variations of the load imposed on the motor. Seeing that the ground-engaging wheel, or other element, is relieved of the work of driving the implement component—work which may be heavy— the use of a light frictional change speed gear becomes practicable. Nevertheless one may use instead of such a gear any appropriate toothed-gearwheel change speed gear, which may be of very light and simple construction.

I claim:

1. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber, and between said exhaust line and the outlet of said main chamber in predetermined relative positions of the shafts, and means for driving said control shaft to direct a flow of pressure fluid to and from said main chamber to impart rotation to said motor shaft in synchronism with the rotation of the control shaft.

2. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, said control shaft having an axial passage operative to direct pressure fluid between the motor shaft and the inner end of the control shaft effective to urge the latter outwardly relative to the motor shaft.

3. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, said control shaft having an axial bore in communication with the port connected to the source of pressure fluid, and valve means in said bore operative upon a predetermined rise in the pressure of the fluid for diverting the fluid flow to exhaust.

4. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, means for driving said control shaft to direct a flow of pressure fluid to and from said main chamber to impart rotation to said motor shaft in synchronism with the rotation of the control shaft, said driving means including a variable ratio gear by which the rotative speed of the control shaft may be adjusted selectively.

5. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, a continuously rotating driving member supported in said casing adjacent the outer end of said control shaft, said control shaft having an axial passage operative to direct pressure fluid between the motor shaft and the inner end of the control shaft effective to urge the latter toward and maintain it in operative relation to said driving member.

6. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, a continuously rotating driving member supported in said casing adjacent the outer end of said control shaft, a motion transmitting element interposed between said driving member and the control shaft, and means for adjusting the position of said element to vary the rotative speed imparted to the control shaft by said driving member.

7. A hydraulic power unit and control comprising, in combination, a casing defining a main chamber having a fluid inlet and a fluid outlet and an axial extension at one end constituting a valve chamber, ports and passages in said casing connecting said valve chamber with said inlet and said outlet, other ports and passages connecting said valve chamber with a source of fluid under pressure and with an exhaust line, a motor shaft journaled in said casing having a vane supporting enlargement disposed in said main chamber and a tubular end portion extending into and rotatable in said valve chamber, a series of vanes mounted on said enlargement and cooperating with the walls of said main chamber, a control shaft fitted into the tubular portion of said motor shaft for rotation relative thereto, each of said shafts having a series of radially disposed ports spaced apart so as to establish communication between the source of pressure fluid and the inlet of said main chamber and between said exhaust line and the outlet of said main chamber in predetermined relative positions of the shafts, a continuously rotating driving member supported in said casing adjacent the outer end of said control shaft, a motion transmitting element interposed between said driving member and the control shaft, said control shaft having an axial passage operative to direct pressure fluid between the motor shaft and the inner end of the control shaft effective to urge the latter toward the driving member and thereby maintain the driving effectiveness of said element, and manually operable means for adjusting the position of said element to vary the speed ratio between the driving member and the control shaft.

References Cited in the file of this patent
UNITED STATES PATENTS

| | | |
|---|---|---|
| 2,138,050 | Vickers | Nov. 29, 1938 |
| 2,469,673 | Whitmore | May 10, 1949 |
| 2,708,353 | Brady | May 17, 1955 |
| 2,708,354 | Brady et al. | May 17, 1955 |
| 2,827,881 | Zumbusch | Mar. 25, 1958 |

FOREIGN PATENTS

| | | |
|---|---|---|
| 163,849 | Germany | Oct. 17, 1905 |
| 530,635 | France | Oct. 6, 1921 |